(12) United States Patent
Bae et al.

(10) Patent No.: US 12,183,933 B2
(45) Date of Patent: Dec. 31, 2024

(54) CYLINDRICAL BATTERY AND MANUFACTURING METHOD THEREOF

(71) Applicant: LG CHEM, LTD., Seoul (KR)

(72) Inventors: Kwan Hong Bae, Daejeon (KR); Chan Woo Park, Daejeon (KR); Yeon Kyong Wang, Daejeon (KR); Jin Seop Kwak, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 876 days.

(21) Appl. No.: 17/264,102

(22) PCT Filed: Aug. 19, 2019

(86) PCT No.: PCT/KR2019/010496
§ 371 (c)(1),
(2) Date: Jan. 28, 2021

(87) PCT Pub. No.: WO2020/045873
PCT Pub. Date: Mar. 5, 2020

(65) Prior Publication Data
US 2021/0305648 A1 Sep. 30, 2021

(30) Foreign Application Priority Data
Aug. 28, 2018 (KR) .......................... 10-2018-0101584

(51) Int. Cl.
*H01M 50/186* (2021.01)
*B23K 26/36* (2014.01)
(Continued)

(52) U.S. Cl.
CPC ........... *H01M 50/186* (2021.01); *B23K 26/36* (2013.01); *H01M 50/107* (2021.01);
(Continued)

(58) Field of Classification Search
CPC ............ H01M 50/186; H01M 50/107; H01M 50/167; H01M 50/147; B23K 26/36
(Continued)

(56) References Cited

U.S. PATENT DOCUMENTS 4,725,515 A * 2/1988 Jurca ................... H01M 50/184
429/185
8,097,358 B2 1/2012 Lee
(Continued)

FOREIGN PATENT DOCUMENTS

CN 107706459 A * 2/2018 .......... H01M 10/058
JP 2000-30675 A 1/2000
(Continued)

OTHER PUBLICATIONS

International Search Report issued in PCT/KR2019/010496 (PCT/ISA/210), dated Dec. 4, 2019.
(Continued)

*Primary Examiner* — James M Erwin
*Assistant Examiner* — John S Medley
(74) *Attorney, Agent, or Firm* — Birch, Stewart, Kolasch & Birch, LLP (57) ABSTRACT

A cylindrical battery in which an electrode assembly is housed in a cylindrical can includes a cap assembly covering an upper opening of the cylindrical can; and a gasket disposed in a space between the cylindrical can and the cap assembly. The gasket is disposed on a crimping part formed by processing an end part of the cylindrical can to be bent, and an exposed part of the gasket protruded outside from a space between the cylindrical can and the cap assembly covers a trimming part of the cylindrical can.

7 Claims, 6 Drawing Sheets

(51) Int. Cl.
  *H01M 50/107* (2021.01)
  *H01M 50/147* (2021.01)
  *H01M 50/167* (2021.01)
  *B23K 101/36* (2006.01)

(52) U.S. Cl.
  CPC ....... *H01M 50/147* (2021.01); *H01M 50/167* (2021.01); *B23K 2101/36* (2018.08)

(58) Field of Classification Search
  USPC ........................................................ 429/174
  See application file for complete search history.

(56) References Cited

U.S. PATENT DOCUMENTS

| | | | |
|---|---|---|---|
| 2012/0070723 A1 | 3/2012 | Matsui et al. | |
| 2012/0094169 A1* | 4/2012 | Kim | H01M 50/119 429/164 |
| 2014/0096374 A1* | 4/2014 | Syuto | H01M 50/264 29/730 |
| 2018/0047950 A1* | 2/2018 | Lim | H01M 50/183 |
| 2019/0148683 A1 | 5/2019 | Kwon et al. | |
| 2019/0233281 A1* | 8/2019 | Bedjaoui | B81C 1/00285 |

FOREIGN PATENT DOCUMENTS

| | | | | |
|---|---|---|---|---|
| JP | 2011-258501 A | | 12/2011 | |
| JP | 6302654 B2 | | 3/2018 | |
| KR | 10-1998-030967 A | | 7/1998 | |
| KR | 10-1998-057861 A | | 9/1998 | |
| KR | 10-2000-0044890 A | | 7/2000 | |
| KR | 10-2004-0107926 A | | 12/2004 | |
| KR | 10-0601521 B1 | | 7/2006 | |
| KR | 10-0846955 B1 | | 7/2008 | |
| KR | 20090047780 A | * | 5/2009 | .......... H01M 50/166 |
| KR | 20130040714 A | * | 4/2013 | ............. B23K 26/21 |
| KR | 10-2016-0042327 A | | 4/2016 | |
| KR | 20160118931 A | * | 10/2016 | ............ H01M 10/04 |
| KR | 10-2017-0012138 A | | 2/2017 | |
| KR | 10-2017-0085978 A | | 7/2017 | |
| KR | 10-2018-0072990 A | | 7/2018 | |
| WO | WO-2018030836 A1 | * | 2/2018 | ........ H01M 50/3425 |

OTHER PUBLICATIONS

Extended European Search Report for European Application No. 19855594.8, dated Jun. 21, 2021.

* cited by examiner

CYLINDRICAL BATTERY AND MANUFACTURING METHOD THEREOF

TECHNICAL FIELD

This application claims priority to and the benefit of Korean Patent Application No. 10-2018-0101584 filed in the Korean Intellectual Property Office on Aug. 28, 2018, the entire contents of which are incorporated herein by reference.

The present invention relates to a cylindrical battery and a manufacturing method thereof.

BACKGROUND ART

Recently, price increases of energy sources caused by exhaustion of fossil fuels, and environmental contamination, have intensified, and environmentally-friendly alternative sources of energy are becoming basic essentials for future life. Accordingly, studies on various electric power generating methods such as nuclear energy, solar power, wind power, and tidal power are in progress, and huge interest in electric power storing devices for more efficiently using energy produced in this way continues.

Further, as technical developments and demands for mobile devices and cell vehicles increase, demands for batteries as an energy source substantially increase, and accordingly, many studies on batteries for satisfying various kinds of demands are currently being performed. Particularly, in the viewpoint of materials, there are high demands on lithium rechargeable batteries such as a lithium ion battery or a lithium ion polymer battery having merits including high energy density, a good discharging voltage, and output stability.

The rechargeable batteries are classified depending on the structures of an electrode assembly in which a positive electrode, a negative electrode, and a separation film provided between the positive electrode and the negative electrode are stacked. Typical ones include a jelly roll type (winding type) of electrode assembly in which a long sheet type of positive electrode and negative electrode are wound while a separation film is provided therebetween, and a stacking type of electrode assembly in which a plurality of positive electrodes and negative electrodes cut to a predetermined size of unit are sequentially stacked while a separation film is provided therebetween, and recently, in order to solve the drawbacks of the jelly roll type of electrode assembly and the stacking type of electrode assembly, a stacking/folding type of electrode assembly in which unit cells in which positive electrodes and negative electrodes with a predetermined size are stacked while a separation film is provided therebetween are sequentially wound while provided on a separation film as an electrode assembly with an advanced structure that is a mixture of the jelly roll type and the stacking type is being developed.

According to the purpose of use, such electrode assemblies are accommodated in a pouch case, a cylindrical can, or a rectangular case to manufacture the battery.

Among these, the cylindrical battery is easy to manufacture and has high energy density per unit weight as a merit, and is used as an energy source for various devices ranging from portable computers to battery-powered cars.

Figure 1:
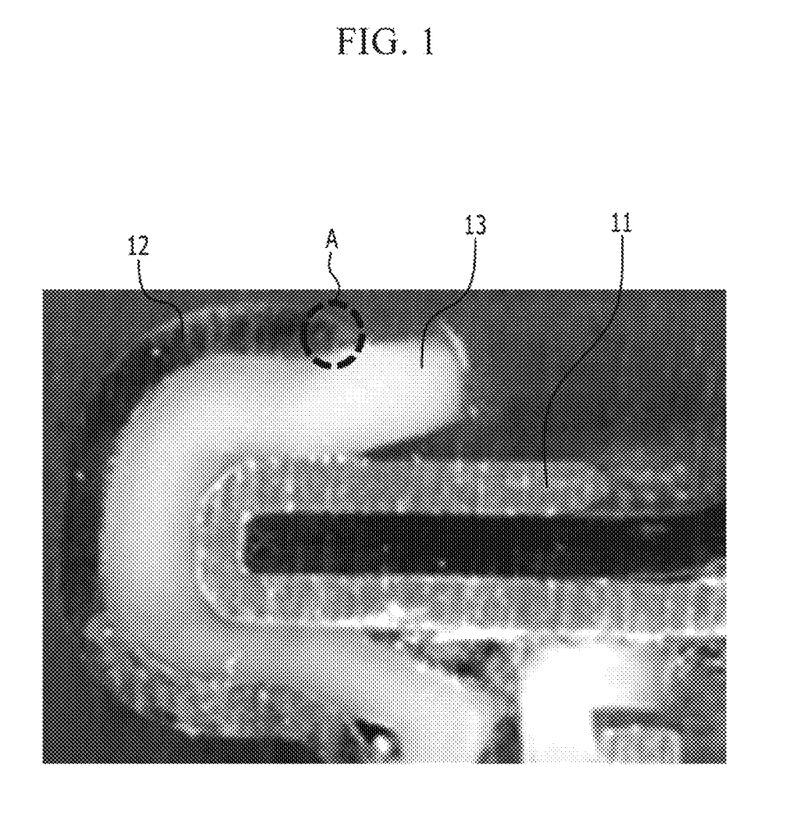
FIG. 1 is a cross-sectional view of a crimping part of a conventional cylindrical battery.
Figure 2:
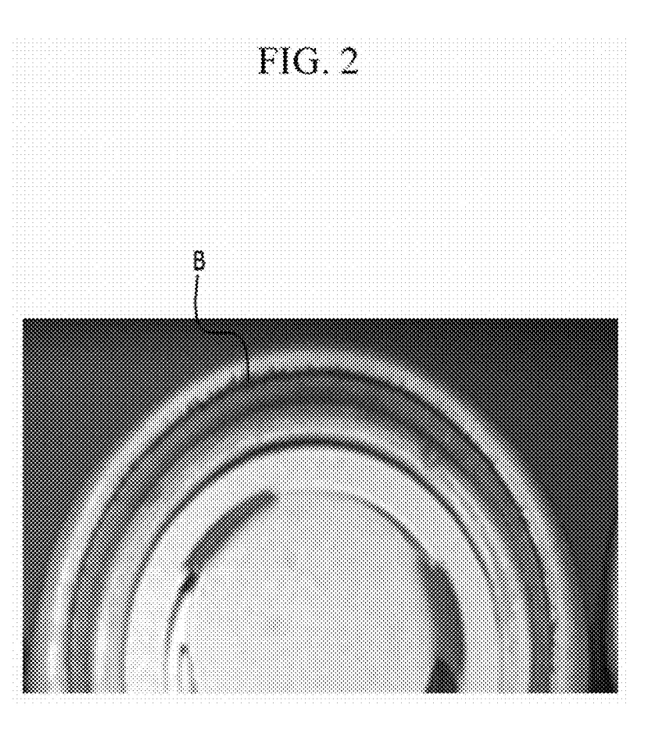
FIG. 2 is a photograph showing corrosion occurring at a trimming part of the cylindrical battery of FIG. 1.
Figure 3:
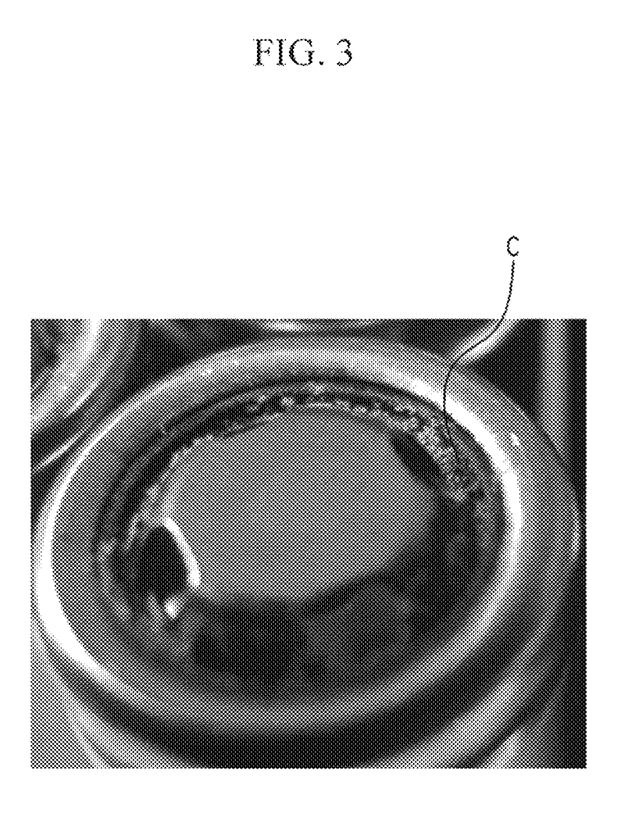
FIG. 3 is a photograph showing corrosion occurring between a gasket and a cap assembly at an upper surface of a cylindrical battery of FIG. 1.

FIG. 1 is a cross-sectional view of a crimping part of a conventional cylindrical battery. FIG. 2 is a photograph showing corrosion occurring at a trimming part of the cylindrical battery of FIG. 1. FIG. 3 is a photograph showing corrosion occurring between a gasket and a cap assembly upper surface of a cylindrical battery of FIG. 1. The trimming part means an end part of the cylindrical can.

Referring to FIG. 1 to FIG. 3, a gasket 13 is disposed between an outer surface of a cap assembly 11 and an inner surface of a cylindrical can 12, and an upper end part of the cylindrical can 12 is processed to be bent, thereby forming a crimping structure for closing and sealing the inside of the cylindrical can 12. Generally, the cylindrical can 12 is manufactured by cutting a steel plate that is nickel plated on both sides to a predetermined size and processing it. Accordingly, since the trimming part A of the cylindrical can 12 is not nickel-plated, when it is exposed to external moisture, corrosion is generated like "B" of FIG. 2 (a modified position in the drawing), and if the degree of the corrosion is too severe, sealing strength of the crimping part is weakened, and there is a risk of a leakage of the electrolyte solution inside.

Also, in the case that the electrolyte solution and the moisture generated in the battery manufacturing and cleansing processes remain at the interface between the gasket 13 and the upper surface of the cap assembly 11, the corrosion is generated like C of FIG. 3, and when the corrosion is severe, there is a risk of leaking the electrolyte solution or changing a short-circuit pressure of the battery's CID (current interrupt device) filter.

Therefore, there is a need for a technology that may fundamentally solve this problem.

Disclosure

An object of the present invention is to solve the problems of the prior art and technical problems from the past.

The inventors of the present invention, having performed in-depth research and experimentation, confirmed that prevention of the corrosion may be obtained by covering a trimming part of a cylindrical can with a gasket to prevent contact with air and irradiating a laser beam between an upper surface of a cap assembly and a gasket to remove an electrolyte solution and moisture, and completed the present invention.

A cylindrical battery according to the present invention includes: a cylindrical can configured to house an electrode assembly, the cylindrical can having an upper opening at an end part of the cylindrical can and a crimping part formed at the upper opening by bending the end part of the cylindrical can; a cap assembly covering the upper opening of the cylindrical can; and a gasket disposed in a space between the cylindrical can and the cap assembly, wherein the gasket is disposed on the crimping part, and wherein the exposed part of the gasket protrudes outside of the space between the cylindrical can and the cap assembly to cover a trimming part of the cylindrical can.

The exposed part of the gasket may be bent and in contact with the trimming part of the cylindrical can.

The trimming part of the cylindrical can in contact with the exposed part of the gasket may be formed of steel.

A lower end surface of the exposed part of the gasket may be spaced apart from an upper surface of the cap assembly.

The upper surface of the cap assembly spaced apart from the lower end surface of the exposed part of the gasket may only include a metal component.

A method for manufacturing a cylindrical battery according to the present invention includes: a step of trimming a top end part of a cylindrical can; a step of housing an electrode assembly in the cylindrical can; a step of mounting the cap assembly at the top end of the electrode assembly; a step of providing a gasket between the cap assembly and an upper end part of the cylindrical can; a step of processing the upper end part of the cylindrical can to form a crimping part; and a step of pressing an exposed part of the gasket protruding outside from a space between the cylindrical can and the cap assembly to be bent into the trimming part of the cylindrical can.

In the step of pressing the exposed part of the gasket, a pressure rod may be used to press the exposed part of the gasket, and the pressure rod may include a heating member.

The temperature of the pressure rod may be 100 degrees to 300 degrees Celsius.

In the step of pressing the exposed part of the gasket, the cylindrical can may be rotated while the exposed part of the gasket is pressed.

A step of irradiating a laser beam between the upper surface of the cap assembly and the exposed part of the gasket to remove an electrolyte solution and moisture may be further included.

Energy of the laser beam may be in a range of 20 to 50 Joules.

A peak output of the laser beam may have a range of 3 kilowatts to 8 kilowatts.

A temperature range of a point where the laser beam L is irradiated may be 400 to 600 degrees Celsius.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, unless explicitly described to the contrary, the word "comprise" and variations such as "comprises" or "comprising" will be understood to imply the inclusion of stated elements but not the exclusion of any other elements.

Further, in the specification, the word "in a cross-section" means when a cross-section taken by vertically cutting an object portion is viewed from the side.

Figure 4:
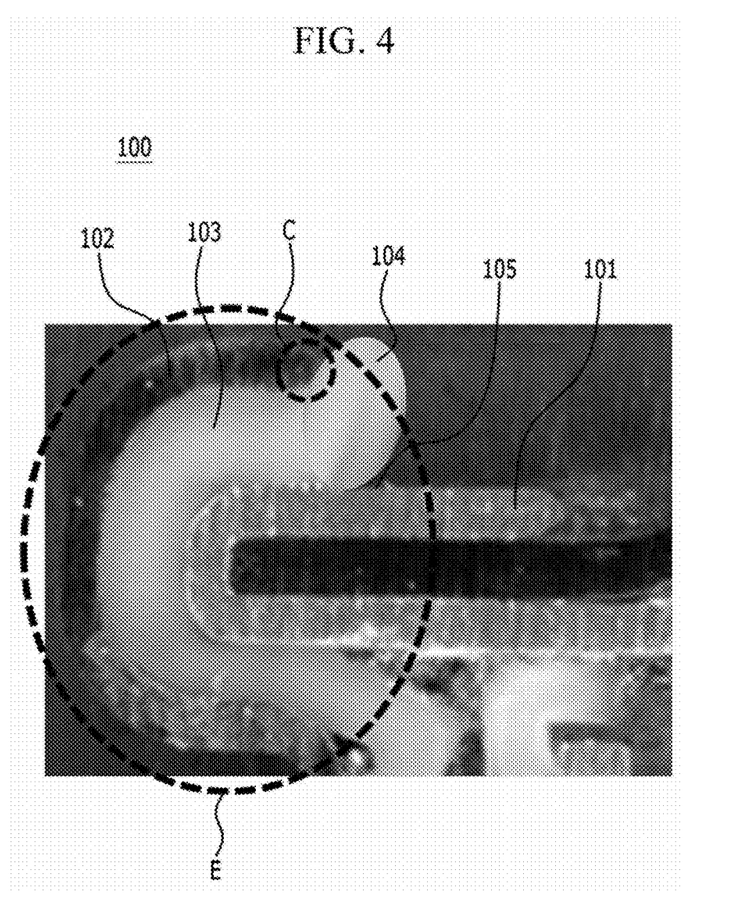
FIG. 4 is a cross-sectional view showing a crimping part of a cylindrical battery according to an exemplary embodiment of the present invention.

FIG. 4 is a cross-sectional view of a crimping part of a cylindrical battery according to an exemplary embodiment of the present invention.

The cylindrical battery 100 has an electrode assembly (not shown) housed in a cylindrical can 102. A cap assembly 101 is disposed with a shape covering the upper opening of the cylindrical can 102.

In the state that a gasket 103 is disposed between the outer surface of the cap assembly 101 and the inner surface of the cylindrical can 102, a crimping part E closing and sealing the inside of the cylindrical can 102 is formed by processing the upper end part of the cylindrical can 102 to be bent. Part of the cap assembly 101 is disposed in a space formed inside the crimping part E. The gasket 103 is disposed between the cap assembly 101 and the cylindrical can 102 in the space.

The cylindrical can 102 may be manufactured by processing a steel sheet plated with nickel on both sides.

According to the present exemplary embodiment, an exposed part 104 of the gasket 103 protruded outside from the space between the cylindrical can 102 and the cap assembly 101 is bent in the trimming part C side of the cylindrical can 12, thereby being formed of a structure covering the trimming part C while the exposed part 104 of the gasket 103 is in contact with the trimming part C. The trimming part C in contact with the exposed part 104 of the gasket 103 is made of steel. In this case, the lower end surface of the exposed part 104 of the gasket 103 may be spaced apart from the upper surface of the cap assembly 101. The method of bending the exposed part 104 of the gasket 103 is described in detail later. By this structure, the trimming part C is not exposed to external air and moisture, thereby preventing the occurrence of the corrosion in the trimming part C.

Also, a laser beam may be irradiated between an upper surface 105 of the cap assembly 101 and the exposed part 104 of the gasket 103 to remove remaining moisture and electrolyte solution. Accordingly, in the cylindrical battery according to the present exemplary embodiment, the upper surface of the cap assembly 101 spaced apart from the lower end surface of the exposed part 104 of the gasket 103 may only include a metal component. Before the laser beam irradiation, P, F, O, Al, etc. may be detected in the remaining moisture and electrolyte solution component. The irradiation of the laser beam is described later in detail.

The gasket 103 is a material with an electrical insulation, impact resistance, elasticity, and durability characteristics, and may be made of a polymer resin with a melting point of more than 200 degrees Celsius.

Figure 5:
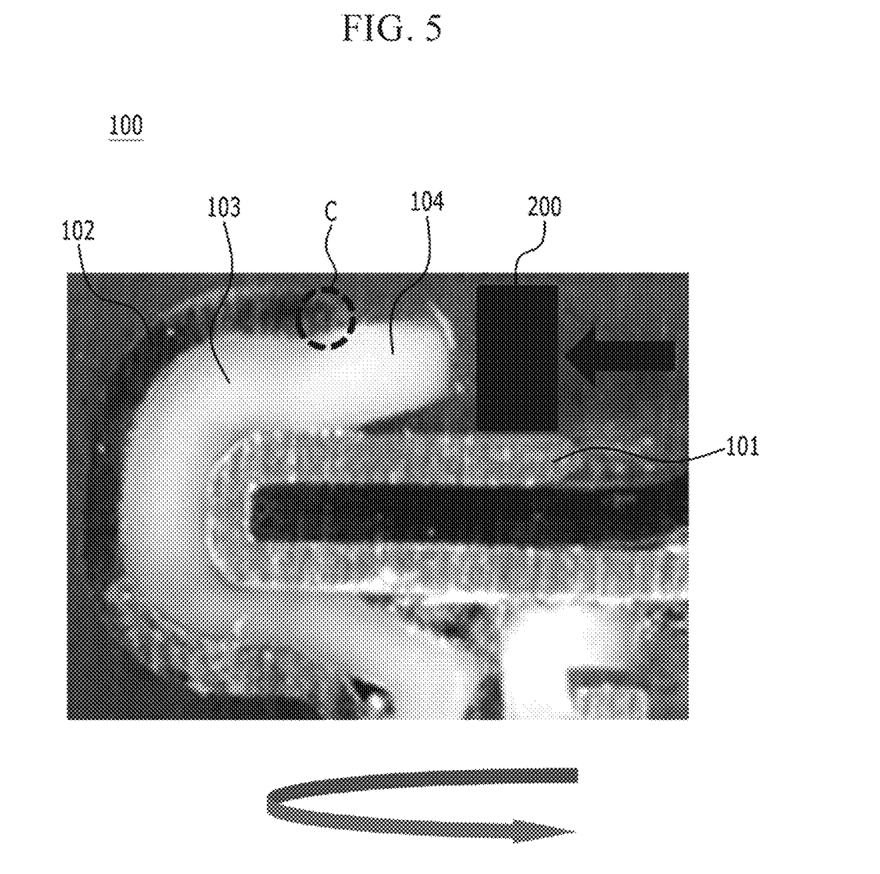
FIG. 5 is a schematic view showing bending of an exposed part of a gasket in a cylindrical battery of FIG. 4 by using a pressure rod.

FIG. 5 is a schematic view showing bending of an exposed part of a gasket in a cylindrical battery of FIG. 4 by using a pressure rod.

First, the cylindrical battery 100 is rotated 360 degrees (referring to an arrow at a bottom of FIG. 5) at a constant speed. The rotation speed of the cylindrical battery 100 is not particularly limited, 5 but it is preferable to maintain a range of 2 to 8 times per second. While the cylindrical battery 100 is rotating, the exposed part 104 of the gasket 103 is pressed to the trimming part C side by the pressure rod 200. At this time, the exposed part 104 of the gasket 103 may be bent to cover the trimming part C by pressing.

The material of the pressure rod 200 is not particularly limited, but it is preferable to use a pressure rod 200 made of a metal material capable of being heated, because heat must be transferred to the exposed part 104 of the gasket 103 to easily induce deformation of the exposed part 104.

The temperature of the pressure rod 200 may be variously determined in consideration of the material of the gasket 103 and the fabrication structure of the cylindrical battery 100, but it is preferable to maintain a temperature of 100 degrees to 300 degrees Celsius. If the temperature of the pressure rod 200 is less than 100 degrees Celsius, it is not preferable because it is not easy to induce deformation of the exposed part 104 of the gasket 103. In addition, when the temperature of the pressure rod 200 exceeds 300 degrees Celsius, severe deformation occurs in the exposed part 104 of the gasket 103 and it is not easy to form the desired bending shape, and in addition, parts other than the exposed part 104 of the gasket 103 are deformed, which is not preferable because the electrolyte solution may leak by weakening the sealing force of the crimping part.

Specifically, it is desirable to maintain the temperature of the pressure rod 200 in a range of higher or lower than the melting point of the gasket 103 by 20 degrees Celsius. When the temperature of the pressure rod 200 maintains the above temperature range, it is easy to deform the exposed part 104 of the gasket 103 such that the working time may not only be shortened but also the deformation of the parts other than the exposed part 104 of the gasket 103 may be prevented.

The method of heating the pressure rod 200 is not particularly limited, but as an example, the heating member may be heated by inserting a heating member (not shown) into the pressure rod 200 made of a metal material. It is preferable that the heating member maintains a constant temperature so that the pressure rod 200 is free of a temperature change while deforming the exposed portion 104 of the gasket 103. As one example, the heating member may be a heating coil connected to an external power source to generate heat.

Figure 6:
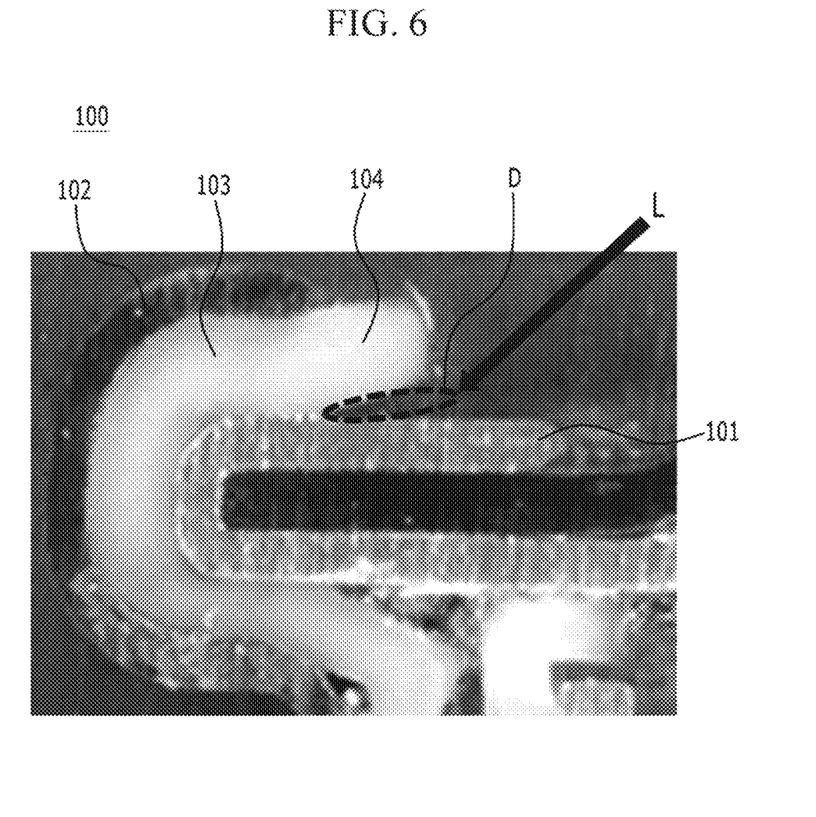
FIG. 6 is a schematic view showing irradiation of a laser beam between a gasket of a cylindrical battery of FIG. 5 and a cap assembly.

FIG. 6 is a schematic view showing irradiation of a laser beam between a gasket of a cylindrical battery of FIG. 5 and a cap assembly.

As described above, when the electrolyte solution and moisture remain in the space D between the gasket 103 and the upper surface of the cap assembly 101, the corrosion occurs in the area where moisture remains, and when the corrosion is severe, as the sealing strength of the crimping part is weakened, the short pressure of a CID filter may be changed and the internal electrolyte solution of the cylindrical battery 100 may leak. The remaining electrolyte solution and moisture may be removed by irradiating a laser beam L.

The laser beam L may be variously selected in consideration of the melting point of the gasket 103 and the upper surface material of the cap assembly 101, but it is preferable that the temperature range of the point where the laser beam L is irradiated is 400 to 600 degrees Celsius, and the temperature range at a part having a 0.5 millimeter radius from the point is 150 degrees to 250 degrees Celsius. When the laser beam L is irradiated to have such a temperature range, the electrolyte solution and moisture remaining in the space D between the gasket 103 and the upper surface of the cap assembly 101 may be removed without deforming the gasket 103.

In order to produce the temperature range by the irradiation of the laser beam L, it is preferable that the energy of the laser beam L has a range of 20 Joules to 50 Joules and a peak output has a range of 3 kilowatts to 8 kilowatts.

The irradiation of the laser beam L may be performed after the step of bending the exposed part 104 of the gasket 103 as well as before it.

Those of ordinary skill in the art to which the present invention belongs will be able to make various applications and modifications within the scope of the present invention.

INDUSTRIAL APPLICABILITY

As described above, the cylindrical battery according to the present invention bends the gasket protruded from the crimping part to be exposed outside in the trimming part side of the cylindrical can to enclose the trimming part, and irradiates the laser beam between the upper surface of the cap assembly and the gasket to remove the electrolyte solution and moisture, thereby preventing the corrosion.

The invention claimed is:
1. A method for manufacturing a cylindrical battery, comprising:
   a step of trimming a top end part of a cylindrical can;
   a step of housing an electrode assembly in the cylindrical can;
   a step of mounting a cap assembly at the top end part of the electrode assembly;
   a step of providing a gasket between the cap assembly and an upper end part of the cylindrical can;
   a step of processing the upper end part of the cylindrical can to form a crimping part; and
   a step of pressing an exposed part of the gasket protruding outside from a space between the cylindrical can and the cap assembly to be bent into the trimming part of the cylindrical can such that an end of the exposed part of the gasket is bent upward to extend beyond the trimming part in a longitudinal direction of the cylindrical can,
   wherein, in the step of pressing the exposed part of the gasket, a pressure rod is used to press the exposed part of the gasket, and
   wherein the pressure rod includes a heating member.
2. The method for manufacturing the cylindrical battery of claim 1, wherein
   a temperature of the pressure rod is 100 degrees to 300 degrees Celsius.
3. A method for manufacturing a cylindrical battery, comprising:
   a step of trimming a top end part of a cylindrical can;
   a step of housing an electrode assembly in the cylindrical can;
   a step of mounting a cap assembly at the top end part of the electrode assembly;
   a step of providing a gasket between the cap assembly and an upper end part of the cylindrical can;
   a step of processing the upper end part of the cylindrical can to form a crimping part; and
   a step of pressing an exposed part of the gasket protruding outside from a space between the cylindrical can and the cap assembly to be bent into the trimming part of the cylindrical can such that an end of the exposed part of the gasket is bent upward to extend beyond the trimming part in a longitudinal direction of the cylindrical can,
   wherein, in the step of pressing the exposed part of the gasket, the cylindrical can is rotated while the exposed part of the gasket is pressed.
4. A method for manufacturing a cylindrical battery, comprising:
   a step of trimming a top end part of a cylindrical can;
   a step of housing an electrode assembly in the cylindrical can;
   a step of mounting a cap assembly at the top end part of the electrode assembly;
   a step of providing a gasket between the cap assembly and an upper end part of the cylindrical can;
   a step of processing the upper end part of the cylindrical can to form a crimping part;
   a step of pressing an exposed part of the gasket protruding outside from a space between the cylindrical can and the cap assembly to be bent into the trimming part of the cylindrical can such that an end of the exposed part of the gasket is bent upward to extend beyond the trimming part in a longitudinal direction of the cylindrical can; and a step of irradiating a laser beam between an upper surface of the cap assembly and the exposed part of the gasket to remove an electrolyte solution and moisture.

5. The method for manufacturing the cylindrical battery of claim 4, wherein energy of the laser beam is in a range of 20 to 50 Joules.

6. The method for manufacturing the cylindrical battery of claim 4, wherein a peak output of the laser beam is in a range of 3 kilowatts to 8 kilowatts.

7. The method for manufacturing the cylindrical battery of claim 4, wherein a temperature range of a point wherein the laser beam is irradiated is 400 to 600 degrees Celsius.

* * * * *